United States Patent [19] | [11] 4,430,385
Dillow et al. | [45] Feb. 7, 1984

[54] COMPOSITELY INSULATED CONDUCTOR HAVING A LAYER OF IRRADIATION CROSS-LINKED POLYMERIC PLASTIC MATERIAL

[75] Inventors: Harry M. Dillow, DeKalb County, Ga.; Anthony E. Sansone, Sarpy County, Nebr.; Raymond K. Swartz, Gwinnett County, Ga.

[73] Assignee: Western Electric Company, Inc., New York, N.Y.

[21] Appl. No.: 349,887

[22] Filed: Feb. 18, 1982

[51] Int. Cl.$^3$ ........................ B32B 7/02; B32B 15/00; D02G 3/00

[52] U.S. Cl. .................................... 428/380; 428/379; 428/401; 174/120 SR; 174/110 SR

[58] Field of Search ............... 428/378, 379, 380, 401, 428/215, 213; 174/110 SR, 120 R

[56] References Cited

U.S. PATENT DOCUMENTS

| | | | |
|---|---|---|---|
| 2,845,404 | 7/1958 | Garner et al. | 428/371 |
| 3,259,688 | 7/1966 | Towne et al. | 174/107 |
| 3,269,867 | 8/1966 | Lanza et al. | 429/34 |
| 3,406,045 | 10/1968 | Sattler | 428/383 |
| 3,463,871 | 8/1969 | Rogers | 428/383 |
| 3,527,874 | 9/1970 | Hayami | 428/383 |
| 3,528,852 | 9/1970 | Olson et al. | 428/383 |
| 3,623,940 | 11/1971 | Gladstone et al. | 170/110 V |
| 3,858,158 | 12/1974 | Henn et al. | 339/99 R |
| 3,916,204 | 10/1975 | Swartz | 250/453 |
| 3,925,671 | 12/1975 | Austin et al. | 250/400 |
| 4,008,368 | 2/1977 | Leuchs | 174/120 R |
| 4,259,281 | 3/1981 | Lanfranconi et al. | 264/102 |
| 4,310,597 | 1/1982 | Checkland et al. | 174/120 SR |

*Primary Examiner*—Marion McCamish
*Assistant Examiner*—Beverly K. Johnson
*Attorney, Agent, or Firm*—E. W. Somers

[57] ABSTRACT

An elongated metallic conductor is insulated with an inner layer of a plasticized polyvinyl chloride composition and an outer layer of a plasticized, irradiation cross-linked polyvinyl chloride composition. The outer layer has a low coefficient of friction to facilitate pulling in central office racks, has mechanical properties which are required for installation and use and, in a preferred embodiment, has a thickness which is substantially less than that of the inner layer. The layers are extruded in the same extruder crosshead that seemingly causes the outer layer to bond to the inner layer to facilitate stripping of the composite insulation from the conductor.

7 Claims, 6 Drawing Figures

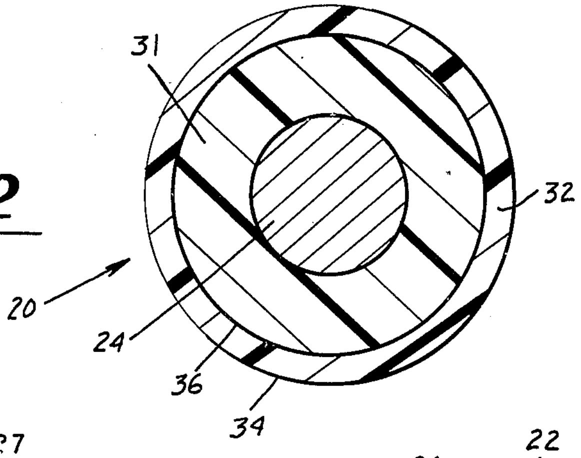
Fig. 2
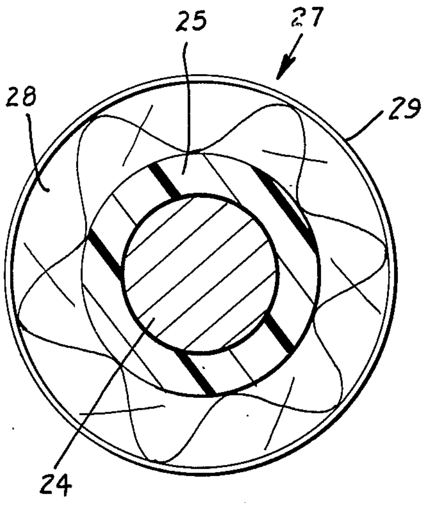
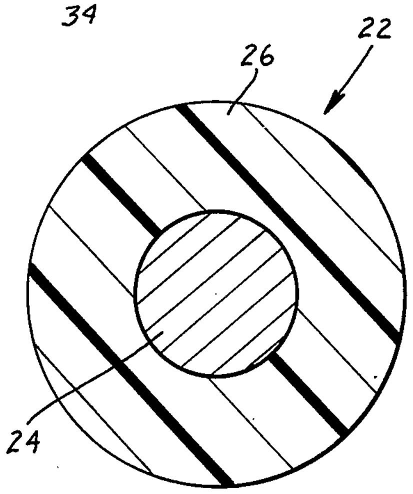
Fig. 3B
Fig. 3A
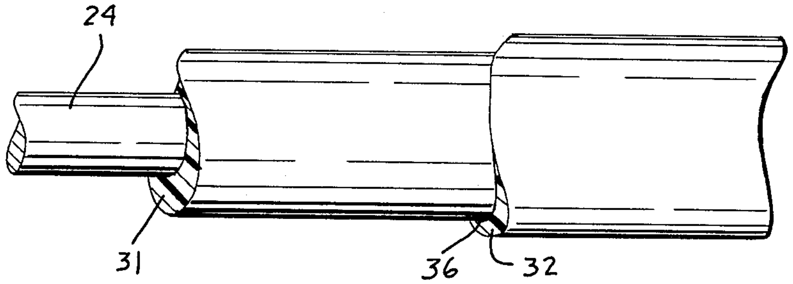
Fig. 1

COMPOSITELY INSULATED CONDUCTOR HAVING A LAYER OF IRRADIATION CROSS-LINKED POLYMERIC PLASTIC MATERIAL

TECHNICAL FIELD

This invention relates to a compositely insulated conductor having a layer of irradiation cross-linked polymeric plastic material. More particularly, a conductor is covered with dual insulation that includes an inner layer of a polyvinyl chloride composition and an outer layer of an irradiation cross-linked, plasticized polyvinyl chloride composition.

BACKGROUND OF THE INVENTION

For almost a decade, metallic conductors, which are insulated with an irradiation cross-linked polymeric plastic material, have been used in the communications industry. These kinds of insulated conductors have been found to be very suitable for applications in which the insulation is required to have relatively high solder heat, abrasion and cut-through resistance values. A metallic conductor such as copper, for example, is insulated with a polyvinyl chloride composition which contains a cross-linkable monomer. Then the insulation is irradiation cross-linked to provide the requirements which are identified hereinbefore. Such a product is shown in U.S. Pat. No. 3,623,940 which issued on Nov. 30, 1971 in the names of H. M. Gladstone and L. D. Loan.

Several problems have developed with respect to the irradiation cross-linked insulation which has been described hereinbefore. In a process for making the insulated conductor, the metallic conductor is preheated and is enclosed in an extrudate comprising the cross-linkable plastic material. It has been found that the minimum temperature to which the metallic conductor in the form of wire must be preheated is especially critical. If the temperature of the metallic conductor is too low, the temperature differential between it and the extrudate will cause rapid cooling and result in thermal stress cracking of the plastic material. Should the preheat temperature be too high, the adhesion between the metallic conductor and the plastic material becomes excessive. It is difficult to control the preheat temperature of a metallic conductor in a manufacturing environment to be within a relatively narrow range in order to meet the above requirements.

Another problem relates to the adhesion of the single layer, irradiation cross-linked insulation to the underlying metallic conductor. It has been found that during the irradiation cross-linking process, the insulation contracts about the metallic conductor. If the outer surface of the metallic conductor does not have a completely regular profile, the adhesion of the insulation is increased and presents problems for craftspersons when they try to strip the insulation from the conductor for field connections.

There is also a problem with respect to twisted pairs of metallic conductors each having an irradiation cross-linked insulation. Normally the cross-linkable polyvinyl chloride composition, prior to irradiation, is softer than a classical thermoplastic polyvinyl chloride composition. If the conductors are twisted together in pairs before the insulation is irradiation cross-linked, the insulation, because it may be highly plasticized, does not exhibit the desired mechanical properties and may be subject to deformation.

Also of concern is the amount of polymeric insulation that is placed over a metallic conductor prior to irradiation cross-linking. Although this insulation is much less costly than a prior style insulation which included a braided covering, it still has a relatively high wall thickness. Therefore in order to irradiation cross-link the polymeric material, a relatively high voltage accelerator is needed. This requires a somewhat high capital investment and the use of concrete vaults in which to perform the cross-linking. It is highly desirable to have a cross-linkable insulation material which covers the conductors and which can be treated by an accelerator on line, and in tandem with the insulation process.

Still another problem arises when using insulation displacement connectors to terminate a conductor which is insulated with a single layer of irradiation cross-linked plastic material. One such connector is a bifurcated beam connector that is shown in U.S. Pat. No. 3,858,158 which issued on May 15, 1974 in the names of R. W. Henn et al. In order to terminate the conventional irradiation cross-linked insulated conductor with a bifurcated beam connector, the insulated conductor must be inserted into a slot of the connector through repetitive steps in order to insure penetration of the insulation by furcations of the split beam portion. Indeed, some commercially available split beam connectors are not approved for making connections with irradiation cross-linked insulated conductors. As a result, these kinds of insulated conductors require more expensive termination arrangements.

One commercially available compositely insulated conductor includes an inner layer of polyolefin insulation which covers a copper conductor and which is surrounded by an irradiated polyvinyl chloride skin. During a stripping operation, it has been found that the removal of the irradiated polyvinyl chloride skin leaves behind the polyolefin inner layer over the copper. This is indicative of a lack of adhesion between the irradiation cross-linked polyvinyl chloride and the polyolefin. The lack of adhesion between the inner and the outer layers creates problems in the field for a craftsperson who, when stripping the insulation, is desirous of removing both the skin and the inner layer. Inasmuch as the inner layer of polyolefin may not be as fire retardant as a polyvinyl chloride composition, the skin must be relatively thick in order to compensate for the lack of fire retardancy of the inner layer. Also, the skin is relatively thick relative to the inner layer in order to obtain required physical properties for the combined layers. This, of course, may require higher voltage accelerators in order to penetrate the relatively thick skin and to obtain a degree of cross-linking necessary to provide the required mechanical properties.

What is desired is a universal type of insulated conductor which can be used in many applications of loose wire such as in central offices, homes, and the like, and which can be wrapped, soldered or used with insulation displacement connectors. What is also required is a method of making such a universal type insulated conductor which has a relatively hard outer surface, which is relatively friction-free to permit pulling of the wire in racks in central offices. The sought after insulated conductor also should be easily manufactured.

SUMMARY OF THE INVENTION

The foregoing needs of the industry have been met by the product and the method of this invention. An insulated conductor in accordance with this invention includes an elongated metallic conductor which is enclosed by two layers of polymeric insulation. An inner layer of the insulation is a thermoplastic polyvinyl chloride composition which includes constituents such as, for example, a plasticizer. An outer layer of insulation which encloses the inner layer is an irradiation cross-linkable polyvinyl chloride material which includes a plasticizer and a cross-linking medium such as a monomer or a mixture of monomers. In a preferred embodiment, the thickness of the outer layer is substantially less than that of the inner layer. Also, the adhesion of the outer layer to the inner layer is greater than that of the inner layer to the metallic conductor. As a result, the percent elongation property of each of the adhered layers is substantially identical.

The resulting composite insulation generally has at least the same properties as the prior art single layer irradiation cross-linked insulation, has improved flexibility and strippability, and is suitable for universal wiring use. Inasmuch as the irradiation cross-linkable material, which is extremely temperature sensitive, is displaced from the metallic conductor, the minimum preheat temperature of the metallic conductor is not as critical as during the application of a single layer of cross-linkable material.

In a method of this invention, a conductor is advanced along a manufacturing line and insulated with a layer of a thermoplastic polyvinyl chloride composition which includes constituents such as a plasticizer and which is destined to become the inner of two layers of insulation. Then the covered conductor is advanced through another portion of the same extruder crosshead where an outer layer of an irradiation cross-linkable polyvinyl chloride composition is applied over the inner layer. Because of the compositions of the two layers and because of their application in the same extruder crosshead, the adhesion of the outer layer to the inner layer is greater than that of the inner layer to the metallic conductor. The adhesion is sufficient to cause the soldered layers to elongate in a substantially unitary manner. In a preferred embodiment, the thickness of the outer layer is substantially less than the thickness of the inner layer. Because of the use of a relatively thin outer layer, the energy requirements for acceleration equipment, which performs the cross-linking, are less. With lower energy requirements, the cross-linking may be accomplished on line, in tandem with insulating, thereby obviating the need for specially constructed vaults and a two pass manufacture.

BRIEF DESCRIPTION OF THE DRAWINGS

Other features of the present invention will be more readily understood from the following detailed description of specific embodiments thereof when read in conjunction with accompanying drawings, in which:

FIG. 1 is an elevational view of an insulated conductor of this invention;

FIG. 2 is a cross-sectional end view of an insulated conductor of this invention; and FIGS. 3A and 3B are cross-sectional end views of prior art insulated conductors;

DETAILED DESCRIPTION

Figure 4:
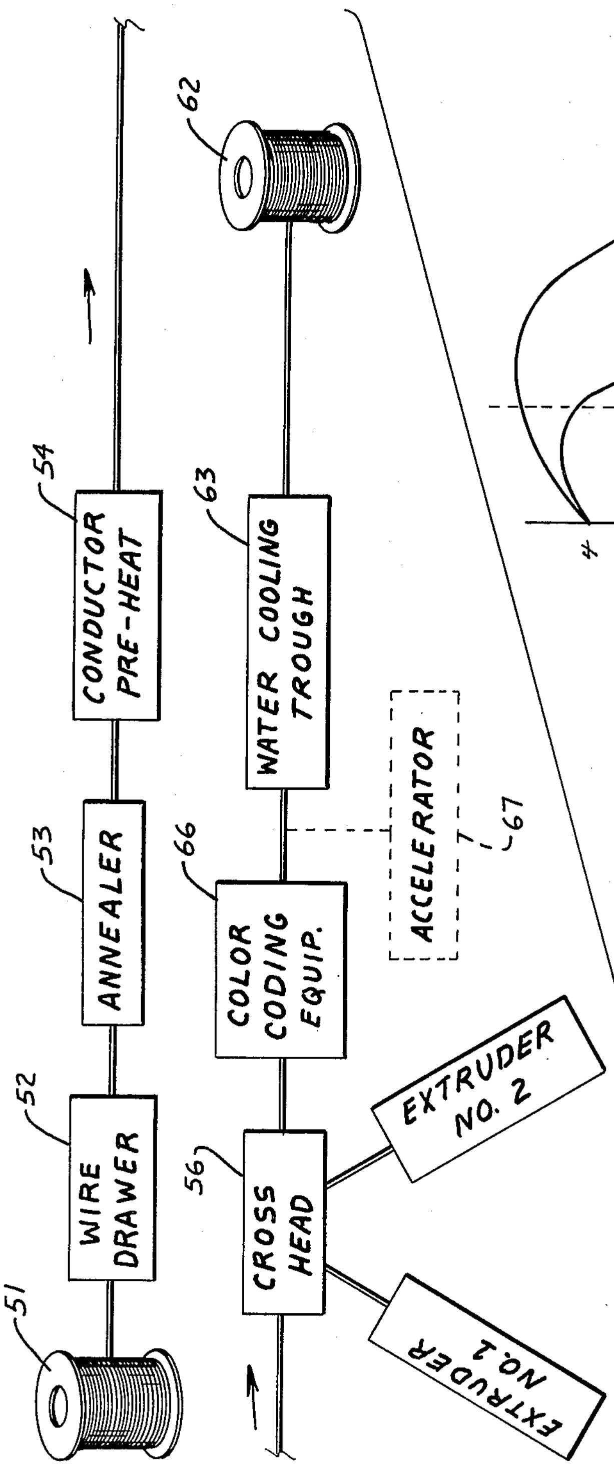
FIG. 4 is a schematic view of an apparatus for making the insulated conductor of FIG. 1.

Referring now to FIGS. 1 and 2, there is shown a compositely insulated conductor 20 of this invention which is adapted to replace an insulated conductor 22 shown in FIG. 3A. The single insulated conductor 22 comprises a metallic conductor 24 and a single layer 26 of an irradiation cross-linked polyvinyl chloride (PVC) insulation material. The single insulated conductor 22 is described in priorly identified U.S. Pat. No. 3,623,940 which is incorporated by reference hereinto. The conductor 22 replaced a conductor 27 (see FIG. 3B) which comprised PVC insulation 25, a textile layer 28 and a fire retardant lacquer 29.

The dual insulated conductor 20 includes the metallic conductor 24 and two layers of insulation. The metallic conductor 24 typically is 22, 24 or 26 gauge copper. An inner layer 31 of the insulation comprises a plasticized PVC composition. The plasticized PVC composition may be one such as that disclosed at page 150 of a paper entitled "The Behaviour of Fire Retardant Communications Cables in Large Scale Fire Tests" by S. Kaufman and M. M. Yocum which appeared in the November 1979 issue of *Plastics and Rubber: Materials and Applications* and which is incorporated by reference hereinto. An outer layer 32, which is often referred to as a skin, comprises a irradiation cross-linked, plasticized PVC composition. An outer surface of the layer 32 is designated 34 and the interface between the insulation layers is designated 36. The composition of the outer layer 32 includes a monomer which functions as a cross-linking medium. The monomer may be a difunctional monomer such as is disclosed in U.S. Pat. No. 3,623,940 or a mixture of difunctional and multifunctional methacrylate monomers such as trimethylolpropane trimethacrylate disclosed in U.S. Pat. No. 4,310,597, which is incorporated by reference hereinto or a multifunctional methacrylate monomer.

The relative thicknesses of the layers 31 and 32 are important. In some applications, the thickness of the inner layer 31 is substantially greater than that of the outer layer 32 in order to achieve substantial flexibility for complex wiring arrangements as well as suitable resistance to abrasion and compression. For one particular general wiring product which is called BH wire, the inner layer 31 has a thickness of about 0.033 cm while that of the outer layer is about 0.013 cm. For wiring that is used on distributing frames in central offices, the thicknesses of the inner and outer layers are 0.015 cm and 0.005 cm, respectively.

The outer diameter of the insulated conductor 20 of this invention is substantially equal to that of the conductor 22 of FIG. 3A. However, the thickness of the irradiation cross-linked outer layer 32 is generally no greater than that of the inner layer 31 and hence less than that of the single layer 26 of a conductor 22. As a result, it is much easier to terminate the conductor 20 with an insulation displacement connector than it is the conductor 22.

In a method of making the insulated conductor 20 of this invention, reference is made to FIG. 4. The copper conductor 24, which in some applications may be tinned, is advanced along a manufacturing line 50 from a supply 51 through a drawing apparatus 52, an annealer 53 and a preheater 54. As the metallic conductor 24 is moved out of the annealer 53, it is advanced through a die which is mounted on the exit side of the annealer which smooths out its surface. Then the conductor is moved through an extruder crosshead 56.

The crosshead 56 includes two sets of tooling. One set is used to apply the inner layer 31 about the tinned conductor 24 and the second set is used to apply the outer layer 32 of a cross-linkable composition. The dual layer covered conductor 24 is color coded with a device 66, cooled in a trough 63 and taken up on a reel 62. Then on another line, it is moved past an accelerator 67 which irradiation cross-links the outer layer 32. See U.S. Pat. No. 3,925,671 which issued on Dec. 9, 1975 in the names of J. R. Austin et al.

For the application of the composite insulation of this invention, the preheat temperature of the metallic conductor 24 is not so critical. The temperature sensitive irradiation cross-linkable composition is displaced from the metallic conductor 24 and is extruded over the plastic material of the inner layer 31. Since the melt temperature of the inner layer 31 is about that of the outer layer, the temperature differential at their interface is essentially negligible. Instead, the much less temperature sensitive inner layer material contacts the metallic conductor. As a result, the preheat temperature may vary from a desired range without causing thermal stress cracking of the outer layer 32.

The relative thicknesses of the dual layers are beneficial to energy requirements for the irradiation cross-linking portion of the manufacturing process. An accelerator having an energy level of 400,000 electron volts is required to irradiation cross-link the single layer shown in FIG. 3A which generally has a thickness of about 0.020 cm. One of only 250,000 electron volts is required to irradiation cross-link the layer 32 which is significantly less thick than its prior art counterpart.

The penetration capability of the electron beam is a function of the voltage of the accelerator. With a thinner skin, less penetration and energy are needed to perform the cross-linking. With such a reduction in energy levels, it is possible to eliminate the concrete vaults in which the cross-linking is presently conducted and perform that step in line in tandem with the extrusion. Accordingly, the accelerator 67 may be positioned between the color coding device 66 and the cooling trough 63 as shown in FIG. 4.

A depth-dose curve may be developed for a particular distance from the window surface of the accelerator 67 where the conductor insulation is irradiation cross-linked. On such a curve, the abscissa represents the depth of penetration of the insulation in centimeters. The ordinate represents a relative surface dose which is received by the insulated conductor 20 at some specific depth and which is expressed in terms of megarads. Depth-dose curves are discussed in detail in U.S. Pat. No. 3,916,204 which issued on Oct. 28, 1975 in the name of R. K. Swartz and which is incorporated by reference thereinto.

Figure 5:
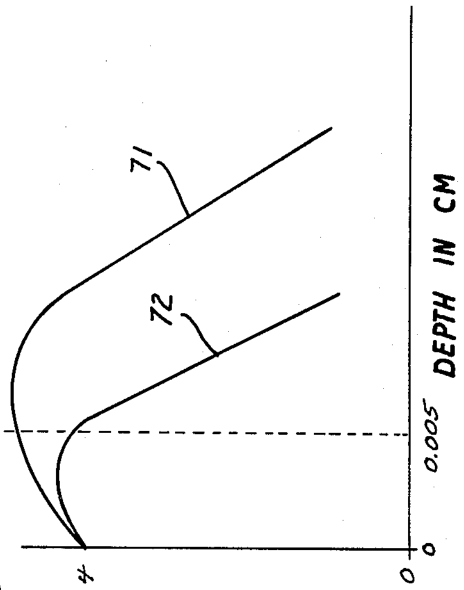
FIG. 5 is a graph to show electron beam energy requirements for cross-linking the insulation of the insulated conductors in FIGS. 1 and 3A.

The graph of FIG. 5 shows a depth-dose curve 71 depicting energy levels required for the prior art single layer irradiation cross-linked insulation 26 and a curve 72 for the insulation of the conductor 20 of this invention. The zero point on the abscissa represents the outer surface of the insulation layer which is cross-linked. Inasmuch as the area under the curve is proportional to the energy which is absorbed by the plastic material, the graph demonstrates that less energy is required to irradiation cross-link the relatively thin skin 32 of the insulated conductor 20 of this invention than the prior art single layer 26 shown in FIG. 3A.

The uniformity of the irradiation process is manifested by the constancy of the dose throughout the thickness of the layer being cross-linked. As shown in the graph in FIG. 5, the dose in curve 72 is substantially constant for a distance of about 0.005 cm from the outer surface 34 of the insulated conductor. In contrast, the dose for the curve 71 increases substantially from about 4 MR within the thickness of the single layer 26.

For the insulated conductor 20 of this invention to be suitable for the environments in which the conductor 22 is used, it must possess suitable mechanical properties. At least predetermined values of mechanical properties such as solder heat, abrasion, and cut-through resistance, elongation and compression resistance are required.

Notwithstanding its significantly reduced outer layer thickness, the insulation of this invention has a cut-through resistance value which is approximately equal to that of the insulation 26 of FIG. 3A. This seemingly results from the use of the inner layer 31 of plasticized PVC which acts as a cushion for the outer layer 32. In the prior art single insulated conductor 22, the relatively hard underlying metallic conductor caused the irradiated insulation 26 to crack somewhat as a test blade was moved into the insulation. With the composite insulation of this invention, the underlying cushioning layer 31 provides some yield, thereby avoiding any cracking of the outer layer and resulting in an acceptable cut-through resistance value.

The dual extrusion of the inner layer 31 and the outer layer 32 of this invention results in a percent elongation value for the composite insulation which is greater than that of either of the adhered layers. It appears that the enhanced adhesion is caused by the extrusion of the two layers 31 and 32 in the same crosshead 56 and by the contraction of the outer layer during the step of irradiation cross-linking. Although PVC is one of the constituents of the materials which are used for the inner and the outer layers 31 and 32, respectively, the adhesion therebetween is not enhanced to the same extent with their extrusion is accomplished in two passes. This is clear from elongation tests on composite insulation which has been extruded in two passes and that extruded in the same crosshead. In the former case, the outer layer 32 exhibited a 125% elongation and the inner layer, a separate elongation of 175%. Because of the adhesion between the layers 31 and 32 of this invention, the layers remain adhered to each other until the composite insulation ruptured and exhibited a single percent elongation of about 200%. The reason is that the insulation applied in two passes behaves as two tubes rather than an integral composite. Under load, the skin or outer layer 32 yields first, followed by the inner layer 31. In contrast, the dual insulation of this invention behaves as one tube thereby providing excellent elongation properties.

These results are particularly surprising in view of the combination of the inner layer 31 with an outer layer 32 which in itself has a substantially lower percent elongation. The improved percent elongation of the composition elongation is also achieved in the preferred embodiment when the thickness of the outer layer 32 is substantially less than that of the outer layer 31.

The effectively unitary behavior of the adhered inner and outer layers in elongation is advantageous during the use of the insulated conductor 20 in central office wiring. It is not uncommon for an insulated conductor, after having been connected to a terminal, to be routed a short distance from the terminal and then turned 90°. The 90° turn creates a stress point which is aggravated if the conductor is soldered to the terminal. But for the enhanced elongation property of the insulated conductor 20 of this invention, the outer layer 32 could break. Also, during soldering of bared end portions, adjacent insulation tends to "shrink back". With the conductor of this invention, it has been found that the inner layer adjacent to the bared ends tends to flow outwardly to help insulate the connection from adjacent ones.

One of the problems of the prior art single layer, irradiation cross-linked insulation is that of undesirably high adhesion of the single layer irradiated cross-linked insulation 26 to the copper conductor 24. It will be recalled that the conductor which is used in these kinds of wiring is a tinned copper conductor. The adhesion problem has been diminished somewhat by advancing the conductor 24, after it has been annealed, through a wiper die. This wiper die smooths out the tin coating on the conductor thereby reducing the amount of surface contact between the plastic insulation and the copper and also reduces substantially the number of depressions in the surface. Methods of and apparatus for causing the conductor to have a substantially smooth surface are disclosed and claimed in copending application Ser. No. 237,182 which was filed on Feb. 23, 1981 in the names of R. K. Swartz and H. L. Woellner.

Typically, an irradiation cross-linkable PVC insulation has an adhesion to the copper conductor of about 0.25 lb. prior to its cross-linking. Subsequent to the cross-linking, the adhesion increases to the range of 2 to 3 lbs. When the dual layers of insulation are extruded about the copper conductor 24, the adhesion of the inner layer 31 to the copper conductor is about 1.5 lbs. Accordingly, it was expected that the after irradiation cross-linking, the adhesion would be much greater than the 2 to 3 lbs., which would be unacceptable. Surprisingly, the adhesion of the inner layer 31 to the copper conductor 24 does not increase after the cross-linking of the outer layer 32.

This surprisingly low adhesion of the inner layer 31 to the metallic conductor 24 results because of the dual layering of the insulation and the composition of the layers. During its irradiation, the outer layer 32 contracts, but because of its reduced thickness compared to that of the single layer, irradiation cross-linked insulation 26, the forces of contraction are not as great. The inner layer 31 of plasticized PVC is compressed by the contracted outer layer 32. However, because of its thickness and its composition, the inner layer 31 acts as a cushion to absorb these forces without becoming so tightened about the copper conductor that its adhesion value is increased to an undesirable value.

The adhesion of the inner layer 31 to the outer layer 32 is substantially greater than that of the inner layer to the copper conductor 24. This is advantageous during insulation stripping operations. A craftsperson who strips the insulation finds that both layers 31 and 32 are stripped simultaneously because of their adhesion to each other. In some commercially available dual insulations, the stripping of the outer layer causes it to separate from the inner layer. As a result, the inner layer 31 remains on the copper conductor 24 thereby requiring additional labor for its removal.

Test procedures are available for determining the mechanical properties for specific insulations. For elongation, a 25.4 cm gauge length sample of the insulation from which the conductor 24 has been removed is tested in accordance with A.S.T.M. D412 at a rate of elongation of 25.4 cm per minute. The insulation is loaded until it fractures at which time its elongation under load is expressed as a percent of its original unloaded length. Cut-through resistance readings are determined by measuring the movement required for a blade at an angle of 45° to the wire section of the insulated conductor 20 to pierce the insulation while the sample is conditioned at a standard test temperature of 23° C.

In accordance with a test for abrasion resistance, a length of the insulated conductor under a force of 3 lb. in tension is disposed adjacent a disc which has a particular grade abrasive paper attached to its periphery. The disc has a diameter of about 15 cm and the abrasive covers about 10 cm of the periphery of the disc. Readings are measured in the number of revolutions which are required to bare the wire sufficiently to cause an electrical shorting.

For compression resistance, values are obtained by using an apparatus such as an Instron tester having a jaw speed of about 5–7 cm per minute. A steel mandrel having a diameter within 0.005 cm of the metallic conductor 24 is inserted into a length of insulation of at least 5 cm from which the conductor has been removed. Reduction in thickness upon application of a crushing load is sufficiently abrupt to indicate failure. The sample is conditioned at the standard test temperature of 23° C. for at least one hour.

Solder heat resistance is measured by spacing two terminals of square cross-sectional configuration about 0.3 cm apart horizontally. An end of a length of the insulated conductor 20 is stripped and is held adjacent to the first terminal and an unstripped portion is passed over the adjacent terminal. The free insulated end of the conductor is loaded with a ½ or 1 lb. weight and the stripped end is soldered to the first terminal. Soldering heat is applied until shorting between the two terminals is observed. The readings are a measure of such time in units of seconds.

The arrangement of the dual layers is effective to provide mechanical properties that are substantially equivalent or better than those of the single layer 26 of irradiation cross-linked polyvinyl chloride shown in FIG. 3A. This is evident from a comparison of property values for the insulated conductors of FIGS. 1 and 3A. For an insulated conductor 22 having an outer diameter of 0.10 cm, the cut-through resistance was found to be 6.3 inch-lbs; the abrasion resistance, 42 revolutions; compression resistance, 1100 lbs; and plastic elongation, 150%. An insulated conductor 20 of this invention was found to have a cut-through resistance of 6.7 in. lbs., an abrasion resistance of 35 revolutions, a compression resistance of 1375 lbs. and an elongation of about 225%. The solder-heat resistance of the conductor 20 is substantially the same as for the conductor 22.

Because the relatively thin skin 32 is the principal contributor to most of these properties, its plasticizer content must be controlled so that it falls within a predetermined range. If the plasticizer content is too low, the elongation properties of the outer layer 32 would suffer. On the other hand, if it is too high, the insulated conductor 20 would have decreased abrasion and heat resistance. The range of the parts by weight of the cross-linking monomers is also important. If the amount of monomer is too low, the modulus of elasticity of the composition at an elevated temperature is reduced, whereas if it is too high, the compression resistance is reduced. Further, in order to achieve the desired properties for a particular application, it has been determined that the combined parts by weight of the monomer and the plasticizer must fall within a range determined by properties required for a specific use or uses.

For the outer layer 32 in one embodiment in which the cross-linking medium is a multifunctional methacrylate monomer and the plasticizer is a linear phthalate, the combined parts by weight of the plasticizer and the cross-linking monomer fall in the range of about 49 to 57 per 100 parts by weight of PVC resin. This designation of the parts by weight of a constituent in a PVC composition relative to 100 parts by weight of PVC resin is conventionally written as parts by weight PHR. It should be understood that commercial PVC polymers which may be used for electrical insulation in accordance with the A.S.T.M. standards for 1966 may contain other admixed material. The designation PHR in terms of parts by weight per hundred parts by weight of resin refers to parts by weight of the PVC or the total admixed PVC. Of those combined parts by weight, the plasticizer range is about 23 to 27 and the cross-linkable monomer range is about 26 to 30 PHR. Other constituents such as stabilizers, lubricants and fire retardant additives, as disclosed in earlier mentioned U.S. Pat. Nos. 3,623,940 and 4,310,597, are included as required. The composition of the inner layer 31 may be that disclosed in the earlier mentioned paper by Kaufman and Yoccum. In a preferred embodiment, the plasticizer of the inner layer is a trimellitate and its parts by weight is 30 PHR.

The composite insulation of this invention provides at least one benefit during subsequent processing of the insulated conductor. It may be desirable to irradiation cross-link a twisted pair of conductors. This is advantageous because of the difficulty in twisting conductors on which the insulation has already been cross-linked and to improve irradiation process yields. The semi-rigid inner layer 31 provides the insulated conductor with sufficient toughness to allow twisting of pairs without deformation prior to the irradiation cross-linking process.

It is to be understood that the above-described arrangements are simply illustrative of the invention. Other arrangements may be devised by those skilled in the art which will embody the principles of the invention and fall within the spirit and scope thereof.

What is claimed is:

1. A compositely insulated conductor, which comprises:

an elongated metallic conductor;

an inner layer of insulation which covers said conductor and which comprises a plasticized polyvinyl chloride composition; and an outer layer of insulation being disposed about said inner layer and having a thickness which is substantially less than that of said inner layer, said outer layer comprising an irradiation cross-linked, plasticized polyvinyl chloride composition and having an adhesion to said inner layer which is substantially greater than that of said inner layer to said elongated metallic conductor and which is sufficient to cause any elongation of the adhered inner and outer layers to be substantially unitary.

2. The insulated conductor of claim 1, wherein said inner layer has a thickness in the range of about 0.015 cm and said outer layer has a thickness of about 0.005 cm.

3. The insulated conductor of claim 1, wherein said inner layer has a thickness in the range of about 0.033 cm and said outer layer has a thickness in the range of about 0.013 cm.

4. The insulated conductor of claim 1, wherein said irradiation cross-linked composition of said outer layer has an irradiation dose history that is substantially constant throughout said outer layer.

5. The insulated conductor of claim 1, wherein said outer layer has a thickness which is substantially equal to that of said inner layer.

6. The insulated conductor of claim 1, wherein said inner and said outer layers of insulation have a composite percent elongation of about 200%.

7. The insulated conductor of claim 1, wherein said elongated metallic conductor is a tinned copper conductor.

* * * * *